United States Patent
Egle

(12) 
(10) Patent No.: US 6,485,115 B1
(45) Date of Patent: Nov. 26, 2002

(54) DRIVE SPROCKET WHICH HAS LUBRICATED PRE-ASSEMBLED CARTRIDGE ASSEMBLY ATTACHED THERETO

(75) Inventor: Kevin M. Egle, Medford, WI (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/939,969

(22) Filed: Aug. 27, 2001

(51) Int. Cl.[7] .............................................. B62D 55/20
(52) U.S. Cl. ........................ 305/199; 305/117; 305/195; 474/156
(58) Field of Search .................. 305/195, 199, 305/193, 194, 117, 119, 196; 474/156, 901, 902

(56) References Cited

U.S. PATENT DOCUMENTS

| | | | | |
|---|---|---|---|---|
| 2,854,294 A | * | 9/1958 | Bannister | 305/196 |
| 6,120,405 A | * | 9/2000 | Oertley et al. | 305/196 |
| 6,142,588 A | * | 11/2000 | Ketting et al. | 305/100 |
| 6,354,679 B1 | * | 3/2002 | Maguire et al. | 305/198 |

* cited by examiner

*Primary Examiner*—Russell D. Stormer
*Assistant Examiner*—Frantz F. Jules
(74) *Attorney, Agent, or Firm*—Maginot Addison & Moore; Calvin Glastetter

(57) ABSTRACT

The cartridge assembly being lubricated and includes a bushing rotatably mounted on a pin with a passageway to receive lubrication oil in the pin. The end portion of the pin includes first and second collars having a groove to receive a sealing arrangement. The collars are press fitted onto the shaft.

22 Claims, 2 Drawing Sheets

DRIVE SPROCKET WHICH HAS
LUBRICATED PRE-ASSEMBLED
CARTRIDGE ASSEMBLY ATTACHED
THERETO

TECHNICAL FIELD

This invention relates generally to track type work machines, and more particularly to a drive sprocket for a track type work machine.

BACKGROUND

Work machines which utilize a track type drive mechanism have several advantages over wheel type work machines. The tracks give the work machine excellent traction while spreading the weight of the machine over a large area. Thus, the track type work machine has enhanced off road capabilities.

A typical undercarriage of a track type drive mechanism consists of a track made of a number of shoes linked together, a drive sprocket which drives the track, and a number of rollers which distribute the weight of the work machine along the track.

In a conventional track type drive, a tooth of the drive sprocket engages a stationary bushing in the shoe of the track. This type of engagement causes considerable wear as the teeth of the drive sprocket advance the track around the drive sprocket. A disadvantage to this type of track drive is that the bushings of the track must be replaced as they wear out. Replacing the shoes of the track and the teeth of the sprocket is costly and time consuming.

One method of reducing track wear is to mount a rotating bushing on the shoes of the track of the work machine. The rotating bushing eliminates much of the friction between the shoes and the teeth of the drive sprocket as the drive sprocket engages and disengages the track as the track is advanced around the drive sprocket. Mounting a rotating bushing on the shoe greatly reduces wear on the track. However, a disadvantage of mounting a rotating bushing on each shoe is the cost of the large number (typically 30 to 50) of bushings needed in order to place a bushing on each shoe of the track assembly.

Another method of reducing track wear is to mount rotating members on the drive sprocket. These rotating members engage drive lugs attached to each shoe of the track. This arrangement also reduces wear on the track. However, this approach also suffers from disadvantages. For example, one disadvantage this approach suffers from is the difficulty of replacing the rotating members on the drive sprocket as they wear out. In particular, replacing the rotating members on the drive sprocket can be costly and time consuming, which in turn increases the cost of operating the work machine.

The present invention is directed to overcoming one or more of the problems or disadvantages associated with the prior art.

SUMMARY OF THE INVENTION

In accordance with one embodiment of the present invention, there is provided a drive sprocket for a track type work machine. The drive sprocket includes a hub and a support secured to the hub. The drive sprocket also includes a cartridge assembly secured to the support. The cartridge assembly has (i) a bushing having a passageway defined therethrough, (ii) a pin having a longitudinal axis, the pin being located within the passageway so that a first end portion and a second end portion of the pin extend outwardly from the passageway of the bushing, (iii) a first collar having a first hole defined therein, the first collar being positioned relative to the pin so that the first end portion of the pin is disposed within the first hole, (iv) a second collar having a second hole defined therein, the second collar being positioned relative to the pin so that the second end portion of the pin is disposed within the second hole, (v) a first seal arrangement interposed the first collar and the bushing such that the first seal arrangement contacts the first collar and the bushing, and (vi) a second seal arrangement interposed the second collar and the bushing such that the second seal arrangement contacts the second collar and the bushing. The first collar is fixed in relation to the pin so that the first collar is unable to rotate relative to the pin. The second collar is fixed in relation to the pin so that the second collar is unable to rotate relative to the pin. The bushing is able to rotate relative to the pin around the longitudinal axis.

In accordance with another embodiment of the present invention, there is provided a track type work machine. The track type work machine includes a track shoe and a drive lug secured to the track shoe. The work machine also includes a drive sprocket having (i) hub, (ii) a support secured to the hub, and (iii) a cartridge assembly secured to the support, the drive sprocket being positioned relative to the drive lug such that the cartridge assembly is in contact with the drive lug. The cartridge assembly includes (i) a bushing having a passageway defined therethrough, (ii) a pin having a longitudinal axis, the pin being located within the passageway so that a first end portion and a second end portion of the pin extend outwardly from the passageway of the bushing, (iii) a first collar having a first hole defined therein, the first collar being positioned relative to the pin so that the first end portion of the pin is disposed within the first hole, (iv) a second collar having a second hole defined therein, the second collar being positioned relative to the pin so that the second end portion of the pin is disposed within the second hole, (v) a first seal arrangement interposed the first collar and the bushing such that the first seal arrangement contacts the first collar and the bushing, and (vi) a second seal arrangement interposed the second collar and the bushing such that the second seal arrangement contacts the second collar and the bushing. The first collar is fixed in relation to the pin so that the first collar is unable to rotate relative to the pin. The second collar is fixed in relation to the pin so that the second collar is unable to rotate relative to the pin. The bushing is able to rotate relative to the pin around the longitudinal axis.

In accordance with still another embodiment of the present invention, there is provided a method of servicing a drive sprocket having (i) a hub and (ii) a support secured to the hub. The method includes securing a cartridge assembly to the support. The cartridge assembly has (i) a bushing having a passageway defined therethrough, (ii) a pin having a longitudinal axis, the pin being located within the passageway so that a first end portion and a second end portion of the pin extend outwardly from the passageway of the bushing, (iii) a first collar having a first hole defined therein, the first collar being positioned relative to the pin so that the first end portion of the pin is disposed within the first hole, (iv) a second collar having a second hole defined therein, the second collar being positioned relative to the pin so that the second end portion of the pin is disposed within the second hole, (v) a first seal arrangement interposed the first collar and the bushing such that the first seal arrangement contacts the first collar and the bushing, and (vi) a second seal arrangement interposed the second collar and the bushing such that the second seal arrangement contacts the second collar and the bushing. The first collar is fixed in relation to the pin so that the first collar is unable to rotate relative to the pin. The second collar is fixed in relation to the pin so that the second collar is unable to rotate relative to the pin. The bushing is able to rotate relative to the pin around the longitudinal axis. The bushing, the pin, the first collar, the first seal arrangement, the second collar, and the second seal arrangement define a substantially sealed chamber between an interior surface of the bushing and an exterior surface of the pin.

In accordance with yet another embodiment of the present invention, there is provided a drive sprocket arrangement having (i) a hub and (ii) a support secured to the hub. The support has a first aperture and a second aperture defined therein. The arrangement includes a cartridge assembly configured to be press fit into the first aperture and the second aperture. The cartridge assembly has a bushing having a passageway defined therethrough and a pin having a longitudinal axis. The pin is located within the passageway so that a first end portion and a second end portion of the pin extend outwardly from the passageway of the bushing. The arrangement also includes a first collar having a first hole defined therein. The first collar is positioned relative to the pin so that the first end portion of the pin is disposed within the first hole. The arrangement also includes a second collar having a second hole defined therein. The second collar is positioned relative to the pin so that the second end portion of the pin is disposed within the second hole. The arrangement further includes a first seal arrangement interposed the first collar and the bushing such that the first seal arrangement contacts the first collar and the bushing. The arrangement also includes a second seal arrangement interposed the second collar and the bushing such that the second seal arrangement contacts the second collar and the bushing. The first collar is fixed in relation to the pin so that the first collar is unable to rotate relative to the pin. The second collar is fixed in relation to the pin so that the second collar is unable to rotate relative to the pin. The bushing is able to rotate relative to the pin around the longitudinal axis.

DETAILED DESCRIPTION

Figure 1:
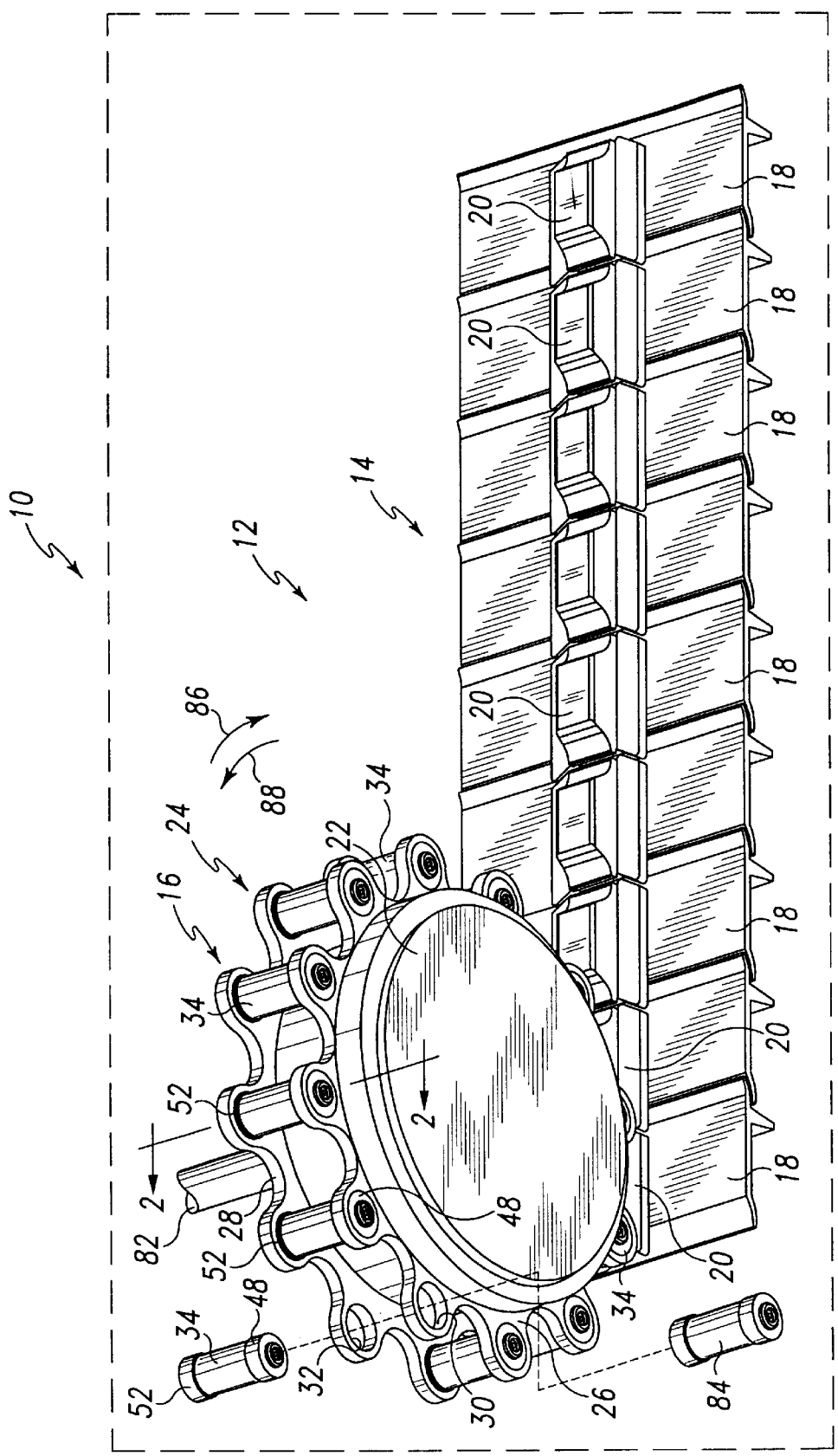
FIG. 1 is a schematic representation of a work machine showing a fragmentary perspective view of an undercarriage assembly thereof.

Referring now to FIG. 1 there is shown a schematic representation of a work machine 10 which incorporates the features of the present invention therein. Work machine 10 includes an undercarriage assembly 12 having a drive sprocket 16, a track chain 14, and a drive shaft 82. Drive shaft 82 is operatively coupled to drive sprocket 16. In particular, drive shaft 82 is mechanically coupled to hub 22 such that an engine (not shown) operatively coupled to drive shaft 82 can rotate drive shaft 82 and drive sprocket 16 in the directions indicated by arrows 86 and 88.

Drive sprocket 16 includes a hub 22 and a support 24 secured to hub 22. Support 24 includes a flange 26 and a flange 28. Each flange 26 and 28 extends outwardly from hub 22 and has a number of apertures defined therein. In particular, flange 26 has apertures 30 defined therein and flange 28 has apertures 32 defined therein. It should be understood that flange 26 is positioned relative to flange 28 so that each aperture 30 is linearly aligned with an aperture 32. As discussed in greater detail below, drive sprocket 16 also has a number of cartridge assemblies 34 secured to support 24. In particular, each pair of aligned apertures 30 and 32 has a cartridge assembly 34 disposed therein, for example press fit therein, so that collars 48 and 52 of cartridge assembly 34 are respectively located with in apertures 30 and 32.

Track chain 14 includes a number of track shoes 18 entrained by a plurality of track links (not shown for clarity of description) which are secured to track links 18. Track chain 14 also includes a drive lug 20 secured to each track shoe 18. It should be appreciated that track chain 14 defines a closed loop which is operatively coupled to the above described drive sprocket 16.

Figure 2:
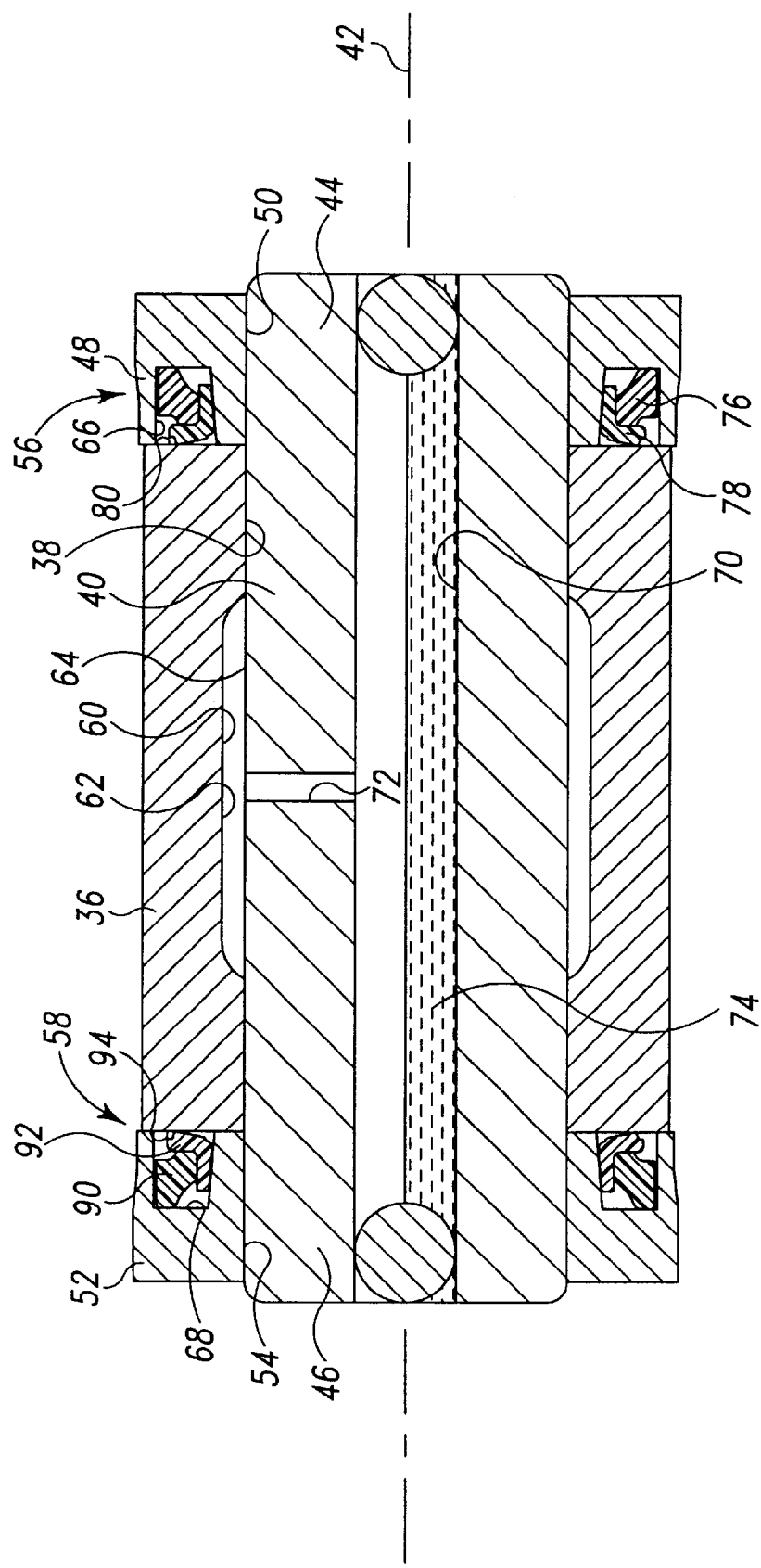
FIG. 2 is a cross sectional view of a cartridge assembly taken along line 2—2 of FIG. 1 (note that the support is not shown for clarity of description).

As previously mentioned, drive sprocket 16 has a number of cartridge assemblies 34 secured to support 24. Note that all of the cartridge assemblies 34 secured to support 24 are substantially identical, therefore only one cartridge assembly 34 will be discussed herein. Now referring to FIG. 2, cartridge assembly 34 includes a bushing 36 having a passageway 38 defined therethrough and a pin 40 having a longitudinal axis 42. Pin 40 is located within passageway 38 so that an end portion 44 and an end portion 46 of pin 40 extend outwardly from passageway 38 of bushing 36. Furthermore, pin 40 has a reservoir 70 and a channel 72 defined therein. Channel 72 is in fluid communication with both reservoir 70 and an exterior surface 64 of pin 40 so that a fluid (e.g. oil) contained within reservoir 70 is advanced from reservoir 70 onto exterior surface 64 of pin 40 during use of drive sprocket 16.

As previously mentioned, cartridge assembly 34 also includes collar 48. Collar 48 has a hole 50 and a seal groove 66 defined therein. Collar 48 is positioned relative to pin 40 so that end portion 44 of pin 40 is disposed within hole 50 and seal groove 66 is in an opposing relationship with bushing 36. As mentioned above, cartridge assembly 34 further includes collar 52. Collar 52 has a hole 54 and a seal groove 68 defined therein. Collar 52 is positioned relative to pin 40 so that end portion 46 of pin 40 is disposed within hole 54 and seal groove 68 is in an opposing relationship with bushing 36. Cartridge assembly 34 also has a seal arrangement 56 interposed collar 48 and bushing 36 such that seal arrangement 56 contacts collar 48 and bushing 36. In particular, seal arrangement 56 includes a thrust member 76 and a seal member 78 which are located in seal groove 66 so that seal member 78 is interposed thrust member 76 and bushing 36 such that seal member 78 is urged into contact with an end face 80 of bushing 36. Cartridge assembly 34 further includes a seal arrangement 58 interposed collar 52 and bushing 36 such that seal arrangement 58 contacts collar 52 and bushing 36. In a similar manner as that discussed above, seal arrangement 58 includes a thrust member 90 and a seal member 92 which are located in seal groove 68 so that seal member 92 is interposed thrust member 90 and bushing 36 such that seal member 92 is urged into contact with an end face 94 of bushing 36.

Collar 48 is fixed in relation to pin 40 so that collar 48 is unable to rotate relative to pin 40. Collar 52 is also fixed in relation to pin 40 so that collar 52 is unable to rotate relative to pin 40. Bushing 36 is able to rotate relative to pin 40 around longitudinal axis 42.

It should be appreciated that bushing 36, pin 40, collar 48, seal arrangement 56, collar 52, and seal arrangement 58 define a substantially sealed chamber 60 between an interior surface 62 of bushing 36 and an exterior surface 64 of pin 40. Substantially sealed chamber 60 contains a lubricant, such as oil, therein which facilitates the functioning of cartridge assembly 34.

Now referring back to FIG. 1, track chain 14 is positioned relative to drive sprocket 16 so that as drive shaft 82 rotates drive sprocket 16 in the directions indicated by arrows 86 and 88, cartridge assemblies 34 come into contact with drive lugs 20 secured to track shoes 18. Contacting cartridge assemblies 34 with drive lugs 20 in the above described manner results in track chain 14 being rotated around a path defined by drive sprocket 16 and one or more idler wheels (not shown). Rotating track chain 14 in the above described manner advances work machine 10 over the ground (not shown) to perform various work functions.

After a time period of operating work machine 10 in the above described manner one or more cartridge assemblies 34 may need replacing due to the wear and tear the cartridge assemblies 34 are subjected to during their use. For example, as shown in FIG. 1, once a worn cartridge assembly 34 that needs replacing is identified, it is removed from support 24 by any a well known manner. Once the worn cartridge assembly 34 is removed from support 24, a pre-assembled replacement cartridge assembly 84 is secured to support 24 so as to replace the worn cartridge assembly 34. In particular, pre-assembled replacement cartridge assembly 84 is press fit into the appropriate apertures 30 and 32 so as to replace the worn cartridge assembly 34. It should be appreciated that replacement cartridge assemblies 84 are substantially identical to the above described cartridge assemblies 34 and therefore a detailed description of replacement cartridge assemblies 84 will not be given herein.

The above described method of replacing worn cartridge assemblies 34 with replacement cartridge assemblies 84 can be repeated as many times as required. Once the worn cartridge assemblies 34 are replaced in the above described manner, track chain 14 is rotated again as previously described so as to advance work machine 10 over the ground (not shown) to perform various work functions.

INDUSTRIAL APPLICABILITY

It should be appreciated that each cartridge assembly 34 (and therefore any replacement cartridge assembly 84) has many advantages which facilitate the functioning of drive sprocket 16 and therefore work machine 10. For example, each cartridge assembly 34 enhances the life of drive sprocket 16 by improving the retention of a lubricant contained within cartridge assembly 34. Moreover, since each cartridge assembly 34 is self-contained and provides essentially all of the sealing and bearing functions required by drive sprocket 16, drive sprocket 16 can be easily serviced by removing old worn cartridge assemblies 34 and replacing them with new replacement cartridge assemblies 84. Removing and replacing the entire worn cartridge assembly 34 to service drive sprocket 16 is more cost effective and efficient as compared to other drive sprocket designs which require servicing in a piece part manner.

Other aspects and features of the present invention can be obtained from a study of the drawings, the disclosures, and the appended claims.

What is claimed is:

1. A drive sprocket for a track type work machine, comprising:

a hub;

a support secured to said hub; and a cartridge assembly secured to said support, said cartridge assembly having (i) a bushing having a passageway defined therethrough, (ii) a pin having a longitudinal axis, said pin being located within said passageway so that a first end portion and a second end portion of said pin extend outwardly from said passageway of said bushing, (iii) a first collar having a first hole defined therein, said first collar being positioned relative to said pin so that said first end portion of said pin is disposed within said first hole, (iv) a second collar having a second hole defined therein, said second collar being positioned relative to said pin so that said second end portion of said pin is disposed within said second hole, (v) a first seal arrangement interposed said first collar and said bushing such that said first seal arrangement contacts said first collar and said bushing, and (vi) a second seal arrangement interposed said second collar and said bushing such that said second seal arrangement contacts said second collar and said bushing, wherein (i) said first collar is fixed in relation to said pin so that said first collar is unable to rotate relative to said pin, (ii) said second collar is fixed in relation to said pin so that said second collar is unable to rotate relative to said pin, and (iii) said bushing is able to rotate relative to said pin around said longitudinal axis.

2. The drive sprocket of claim 1, wherein:

said first collar has a first seal groove defined therein and said first seal arrangement is located within said first seal groove, and said second collar has a second seal groove defined therein and said second seal arrangement is located within said second seal groove.

3. The drive sprocket of claim 2, wherein:

first seal arrangement includes a thrust member and a seal member, and said seal member is interposed said thrust member and said bushing such that said seal member is urged into contact with an end face of said bushing.

4. The drive sprocket of claim 1, wherein:

said pin has a reservoir and a channel defined therein, and said channel is in fluid communication with both said reservoir and said exterior surface of said pin so that a fluid contained within said reservoir is advanced from said reservoir onto said exterior surface of said track pin during use of said drive sprocket.

5. The drive sprocket of claim 1, wherein:

said support includes (i) a first flange extending outwardly from said hub and (ii) a second flange extending outwardly from said hub, said first flange has a first aperture defined therein, said second flange has a second aperture defined therein, and said cartridge assembly is positioned with in said first aperture and said second aperture.

6. The drive sprocket of claim 5, wherein:

said cartridge assembly is press fit into said first aperture and said second aperture such that said first collar is located within said first aperture and said second collar is located within said second aperture.

7. The drive sprocket of claim 1, wherein:

said bushing, said pin, said first collar, said first seal arrangement, said second collar, and said second seal arrangement define a substantially sealed chamber between an interior surface of said bushing and an exterior surface of said pin.

8. The drive sprocket of claim 1, including:

a drive shaft mechanically coupled to said hub.

9. A track type work machine, comprising:

a track shoe;

a drive lug secured to said track shoe; and a drive sprocket having (i) hub, (ii) a support secured to said hub, and (iii) a cartridge assembly secured to said support, said drive sprocket being positioned relative to said drive lug such that said cartridge assembly is in contact with said drive lug, wherein said cartridge assembly includes (i) a bushing having a passageway defined therethrough, (ii) a pin having a longitudinal axis, said pin being located within said passageway so that a first end portion and a second end portion of said pin extend outwardly from said passageway of said bushing, (iii) a first collar having a first hole defined therein, said first collar being positioned relative to said pin so that said first end portion of said pin is disposed within said first hole, (iv) a second collar having a second hole defined therein, said second collar being positioned relative to said pin so that said second end portion of said pin is disposed within said second hole, (v) a first seal arrangement interposed said first collar and said bushing such that said first seal arrangement contacts said first collar and said bushing, and (vi) a second seal arrangement interposed said second collar and said bushing such that said second seal arrangement contacts said second collar and said bushing, and wherein (i) said first collar is fixed in relation to said pin so that said first collar is unable to rotate relative to said pin, (ii) said second collar is fixed in relation to said pin so that said second collar is unable to rotate relative to said pin, and (iii) said bushing is able to rotate relative to said pin around said longitudinal axis.

10. The work machine of claim 9, wherein:

said first collar has a first seal groove defined therein and said first seal arrangement is located within said first seal groove, and said second collar has a second seal groove defined therein and said second seal arrangement is located within said second seal groove.

11. The work machine of claim 10, wherein:

said first seal arrangement includes a thrust member and a seal member, and said seal member is interposed said thrust member and said bushing such that said seal member is urged into contact with an end face of said bushing.

12. The work machine of claim 9, wherein:

said pin has a reservoir and a channel defined therein, and said channel is in fluid communication with both said reservoir and said exterior surface of said pin so that a fluid contained within said reservoir is advanced from said reservoir onto said exterior surface of said track pin during use of said drive sprocket.

13. The work machine of claim 9, wherein:

said support includes (i) a first flange extending outwardly from said hub and (ii) a second flange extending outwardly from said hub, said first flange has a first aperture defined therein, said second flange has a second aperture defined therein, and said cartridge assembly is positioned with in said first aperture and said second aperture.

14. The work machine of claim 13, wherein:

said cartridge assembly is press fit into said first aperture and said second aperture such that said first collar is located within said first aperture and said second collar is located within said second aperture.

15. The work machine of claim 9, wherein:

said bushing, said pin, said first collar, said first seal arrangement, said second collar, and said second seal arrangement define a substantially sealed chamber between an interior surface of said bushing and an exterior surface of said pin.

16. The work machine of claim 9, including:

a drive shaft mechanically coupled to said hub.

17. A method of servicing a drive sprocket having (i) a hub and (ii) a support secured to said hub, comprising:

(a) securing a cartridge assembly to said support, said cartridge assembly having (i) a bushing having a passageway defined therethrough, (ii) a pin having a longitudinal axis, said pin being located within said passageway so that a first end portion and a second end portion of said pin extend outwardly from said passageway of said bushing, (iii) a first collar having a first hole defined therein, said first collar being positioned relative to said pin so that said first end portion of said pin is disposed within said first hole, (iv) a second collar having a second hole defined therein, said second collar being positioned relative to said pin so that said second end portion of said pin is disposed within said second hole, (v) a first seal arrangement interposed said first collar and said bushing such that said first seal arrangement contacts said first collar and said bushing, and (vi) a second seal arrangement interposed said second collar and said bushing such that said second seal arrangement contacts said second collar and said bushing, wherein (i) said first collar is fixed in relation to said pin so that said first collar is unable to rotate relative to said pin, (ii) said second collar is fixed in relation to said pin so that said second collar is unable to rotate relative to said pin, (iii) said bushing is able to rotate relative to said pin around said longitudinal axis, and (iv) said bushing, said pin, said first collar, said first seal arrangement, said second collar, and said second seal arrangement define a substantially sealed chamber between an interior surface of said bushing and an exterior surface of said pin.

18. The method of claim 17, further comprising:

(b) removing said cartridge assembly from said support; and (c) securing a replacement cartridge assembly to said support, said replacement cartridge assembly having (i) a bushing having a passageway defined therethrough, (ii) a pin having a longitudinal axis, said pin being located within said passageway so that a first end portion and a second end portion of said pin extend outwardly from said passageway of said bushing, (iii) a first collar having a first hole defined therein, said first collar being positioned relative to said pin so that said first end portion of said pin is disposed within said first hole, (iv) a second collar having a second hole defined therein, said second collar being positioned relative to said pin so that said second end portion of said pin is disposed within said second hole, (v) a first seal arrangement interposed said first collar and said bushing such that said first seal arrangement contacts said first collar and said bushing, and (vi) a second seal arrangement interposed said second collar and said bushing such that said second seal arrangement contacts said second collar and said bushing, wherein (i) said first collar is fixed in relation to said pin so that said first collar is unable to rotate relative to said pin, (ii) said second collar is fixed in relation to said pin so that said second collar is unable to rotate relative to said pin, (iii) said bushing is able to rotate relative to said pin around said longitudinal axis, and (iv) said bushing, said pin, said first collar, said first seal arrangement, said second collar, and said second seal arrangement define a substantially sealed chamber between an interior surface of said bushing and an exterior surface of said pin.

19. The method of claim 17, wherein:
   (a) includes press fitting said cartridge assembly into an aperture defined in said support.

20. The method of claim 17, wherein:
   (a) includes rotating said drive sprocket so that said cartridge assembly contacts a drive lug which is secured to a track shoe.

21. A drive sprocket arrangement having (i) a hub and (ii) a support secured to said hub, said support having a first aperture and a second aperture defined therein, comprising:
   cartridge assembly configured to be press fit into said first aperture and said second aperture, said cartridge assembly having (i) a bushing having a passageway defined therethrough, (ii) a pin having a longitudinal axis, said pin being located within said passageway so that a first end portion and a second end portion of said pin extend outwardly from said passageway of said bushing, (iii) a first collar having a first hole defined therein, said first collar being positioned relative to said pin so that said first end portion of said pin is disposed within said first hole, (iv) a second collar having a second hole defined therein, said second collar being positioned relative to said pin so that said second end portion of said pin is disposed within said second hole, (v) a first seal arrangement interposed said first collar and said bushing such that said first seal arrangement contacts said first collar and said bushing, and (vi) a second seal arrangement interposed said second collar and said bushing such that said second seal arrangement contacts said second collar and said bushing, wherein (i) said first collar is fixed in relation to said pin so that said first collar is unable to rotate relative to said pin, (ii) said second collar is fixed in relation to said pin so that said second collar is unable to rotate relative to said pin, and (iii) said bushing is able to rotate relative to said pin around said longitudinal axis.

22. The arrangement of claim 21, wherein:
   said bushing, said pin, said first collar, said first seal arrangement, said second collar, and said second seal arrangement define a substantially sealed chamber between an interior surface of said bushing and an exterior surface of said pin.

* * * * *